(12) United States Patent
Kim

(10) Patent No.: US 11,839,003 B2
(45) Date of Patent: Dec. 5, 2023

(54) APPARATUS FOR SUPPLYING POWER TO DRIVE ALTERNATING CURRENT (AC) DIRECT-COUPLED LIGHT-EMITTING DIODES (LED)

(71) Applicant: POINT TEK CO., LTD., Yongin-si (KR)

(72) Inventor: Jun Sik Kim, Yongin-si (KR)

(73) Assignee: POINT TEK CO., LTD., Yongin-si (KR)

( * ) Notice: Subject to any disclaimer, the term of this patent is extended or adjusted under 35 U.S.C. 154(b) by 0 days.

(21) Appl. No.: 17/857,414

(22) Filed: Jul. 5, 2022

(65) Prior Publication Data
US 2023/0010335 A1     Jan. 12, 2023

(30) Foreign Application Priority Data

Jul. 9, 2021  (KR) .................. 10-2021-0090343

(51) Int. Cl.
  *H02M 3/335*  (2006.01)
  *H02M 1/32*   (2007.01)
  *H02M 7/06*   (2006.01)
  *H05B 45/3725* (2020.01)

(52) U.S. Cl.
  CPC .... *H05B 45/3725* (2020.01); *H02M 3/33507* (2013.01); *H02M 3/33561* (2013.01); *H02M 3/33569* (2013.01)

(58) Field of Classification Search
  CPC .......... H02M 1/32; H02M 7/06; H02M 1/007; H02M 1/08; H02M 3/156; H02M 3/33523; H02M 3/335; H02M 1/0054; H02M 1/0087
  See application file for complete search history.

(56) References Cited

U.S. PATENT DOCUMENTS

2007/0194718 A1 *  8/2007  Foo .................... H05B 41/3925
                                          315/158

FOREIGN PATENT DOCUMENTS

| KR | 10 2018 0128547 A | 12/2018 |
| KR | 10 2018 0129254 A | 12/2018 |
| KR | 10-1970818 B1     | 4/2019  |
| KR | 1020200021351 A   | 2/2020  |
| KR | 10 2020 0139494 A | 12/2020 |

OTHER PUBLICATIONS

Office Action issued for KR patent application Serial No. 10-2021-0090343, dated Aug. 10, 2023.

* cited by examiner

*Primary Examiner* — Wei (Victor) Y Chan
(74) *Attorney, Agent, or Firm* — WESTMAN, CHAMPLIN & KOEHLER, P.A.; Amanda M. Prose

(57) ABSTRACT

Provided is an apparatus for supplying power. The apparatus includes a rectifier unit configured to apply a voltage by rectifying alternating current power source, a light emitting unit including a plurality of light emitting diodes which emit light by electric current according to the voltage and are connected in series, a signal generation unit configured to generate a driving signal by dropping the voltage of the rectifier unit, and a switch unit including a plurality of transistors which are connected to the plurality of light emitting diodes, respectively, and are turned on by the driving signal and switch a route of electric current flowing in the plurality of light emitting diodes to be supplied to a microcontroller as power source.

3 Claims, 5 Drawing Sheets

APPARATUS FOR SUPPLYING POWER TO DRIVE ALTERNATING CURRENT (AC) DIRECT-COUPLED LIGHT-EMITTING DIODES (LED)

CROSS-REFERENCE TO RELATED APPLICATION

This application claims priority to and the benefit of Korean Patent Application No. 10-2021-0090343 filed in the Korean Intellectual Property Office on Jul. 9, 2021, the entire contents of which are incorporated herein by reference.

BACKGROUND

Field

The present disclosure relates to an apparatus for driving a light emitting diode (LED), and more particularly, to an apparatus for supplying power to drive an alternating current (AC) direct-coupled light emitting diode.

Description of the Related Art

In order to remotely drive lighting through remote control, IoT environment, etc., a separate power supply that supplies power to sensors or microcontrollers is essential. In the general converter type driving scheme, an inductor is used, which allows a power supply to be easily implemented. However, in the case of AC direct-coupled type, it is driven without an inductor, so an additional converter circuit for power supply or a linear type circuit should be used. If a converter circuit is added, the power factor and harmonic characteristics, which are advantages of AC direct-coupled types, deteriorate, the volume increases, and the cost increases significantly. In the case of the linear scheme, the structure is simple, but the characteristics of the power factor, etc. deteriorate, and the efficiency is greatly reduced.

SUMMARY

The present disclosure provides an apparatus for separately supplying power using electric current flowing in a light emitting diode in an alternating current (AC) direct-coupled light emitting diode driving scheme.

In an aspect, an apparatus for supplying power is provided. The apparatus includes a rectifier unit configured to apply a voltage by rectifying alternating current power source, a light emitting unit including a plurality of light emitting diodes which emit light by electric current according to the voltage and are connected in series, a signal generation unit configured to generate a driving signal by dropping the voltage of the rectifier unit, and a switch unit including a plurality of transistors which are connected to the plurality of light emitting diodes, respectively, and are turned on by the driving signal and switch a route of electric current flowing in the plurality of light emitting diodes to be supplied to a microcontroller as a power source.

The signal generation unit includes an input resistance having a first terminal connected to a route through which electric current is applied from the rectifier unit to the light emitting unit, and a second terminal connected to a cathode of a Zener diode, and the Zener diode having the cathode connected to the second terminal of the input resistance, and a grounded anode.

The plurality of transistors include a standby transistor which has a gate terminal which receives the driving signal, a drain terminal which is connected to an output terminal of the rectifier unit, and a source terminal which is connected to its corresponding switch resistance, and a plurality of switch transistors, each of which has a gate terminal which receives a driving signal according to each light emitting diode, a drain terminal which is connected to a cathode of its corresponding light emitting diode, and a source terminal which is connected to its corresponding switch resistance.

The signal generation unit includes a first signal generation unit which includes a first input resistance having a first terminal connected to a route through which electric current is applied from the rectifier unit to the light emitting unit, and a second terminal connected to a cathode of a Zener diode, and a first Zener diode having the cathode connected to the second terminal of the input resistance, and a grounded anode, and a second signal generation unit which includes a second input resistance having a first terminal connected to a route through which electric current is applied from the rectifier unit to the light emitting unit, and a second terminal connected to the cathode of the Zener diode, the second Zener diode having the cathode connected to the second terminal of the input resistance, and a grounded anode, and a cutoff transistor having a drain terminal connected to a gate terminal of the switch transistor, and a grounded source terminal.

When the cutoff transistor is turned on, the cutoff transistor turns off the switch transistor to block current flowing from the light emitting diode, which is connected to the switch transistor, to the microcontroller.

The apparatus further includes a plurality of diodes which are interposed between the plurality of switch transistors and the plurality of light emitting diodes corresponding to the switch transistors, and block current flowing from the switch transistors in a reverse direction.

The plurality of diodes include a first light emitting diode connected to an output terminal of the rectifier unit, and a second light emitting diode connected to the first light emitting diode in series.

The plurality of transistors include a first transistor having a gate terminal, which receives a first driving signal, and a drain terminal, which is connected to an output terminal of the rectifier unit, a second transistor having a gate terminal, which receives a second driving signal, and a drain terminal, which is connected to a cathode of the first light emitting diode, and a third transistor having a gate terminal, which receives a second driving signal, and a drain terminal, which is connected to a cathode of the second light emitting diode.

The switch unit includes a ground capacitor, a first switch resistance having a first terminal connected to a source terminal of the first transistor and a second terminal connected to the ground capacitor, a second switch resistance having a first terminal connected to a source terminal of the second transistor and a second terminal connected to the ground capacitor, and a third switch resistance having a first terminal connected to a source terminal of the third transistor and a second terminal connected to the ground capacitor. Herein, the first switch resistance is greater than the second switch resistance, and the second switch resistance is greater than the third switch resistance.

The signal generation unit includes a first input resistance having a first terminal connected to a route through which electric current is applied from the rectifier unit to the first light emitting diode, and a second terminal connected to a cathode of a first Zener diode, the first Zener diode having the cathode connected to the second terminal of the input resistance, and a grounded anode, a second input resistance having a first terminal connected to a route through which electric current is applied from the rectifier unit to the first light emitting diode, and a second terminal connected to a cathode of a second Zener diode, the second Zener diode having the cathode connected to the second terminal of the second input resistance, and a grounded anode, and a cutoff transistor having a drain terminal connected to a gate terminal of each of the second transistor and the third transistor, and a grounded source terminal.

The apparatus further includes a first diode having a cathode connected to the drain terminal of the second transistor and an anode connected to the cathode of the first light emitting diode, and a second diode having a cathode connected to the drain terminal of the third transistor and an anode connected to the cathode of the second light emitting diode.

DETAILED DESCRIPTION

Figure 1:
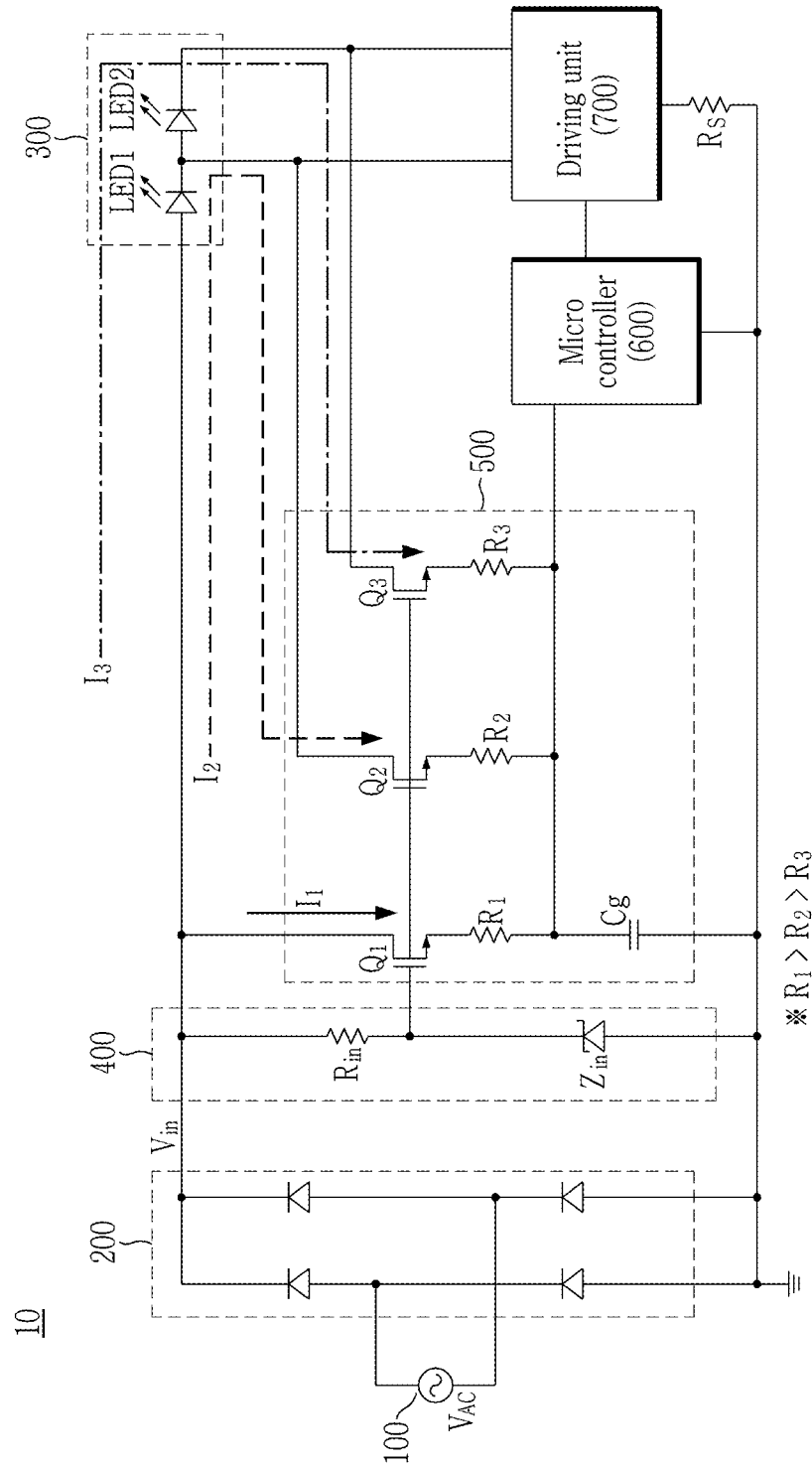
FIG. 1 is a diagram illustrating an apparatus for supplying power to drive an alternating current (AC) direct-coupled light emitting diode according to an embodiment of the present disclosure.

Prior to the detailed description of the present disclosure, the interpretation of the terms and words used in the present specification and claims described below should not be limited to a conventional or dictionary sense, and the terms and words should be interpreted as a meaning and concept that meets the technical idea of the present disclosure based on the principle that the terms and words can be defined properly in order to explain the invention in the best manner. In addition, the terms including ordinal numbers such as "first" and "second" are used to explain various components, and are used only for the purpose of distinguishing one component from another component and are not used to limit the components. For example, the first component may be referred to as a second component, and similarly, the second component may also be referred to as a first component while not departing from the scope of the present disclosure. In addition, terms such as "unit", "module", etc. disclosed in the present specification indicate a unit which processes at least one function or operation, and they can be implemented as hardware, software, or a combination of hardware and software. In addition, words such as "a", "an", "one", and "the" may indicate both the singular and the plural in the context of describing the present disclosure unless it is clearly refuted in the present specification (particularly in claims). In addition, if any component is mentioned as "connected" to another component, this means that it may be logical or physically connected. In other words, it should be understood that a component may be directly connected to another component, but there may be other components therebetween and may be indirectly connected. The terms used in the present specification are used only to describe a specific embodiment and is not intended to limit the present disclosure. Singular expressions include plural expressions unless the context clearly dictates otherwise. Further, the terms such as "include" and "have" in the present specification are used to specify that a feature, a number, a step, an operation, an element, a part, or a combination thereof described in the specification exists, and should be understood as not excluding the possibility of the presence or addition of one or more other features, numbers, steps, operations, elements, parts, or combinations thereof in advance.

Hereinafter, preferred embodiments of the present disclosure will be described in detail with reference to the accompanying drawings. At this time, it should be noted that the same components in the attached drawings are represented by the same symbols. In addition, a detailed description of the known function and configuration that can blur the gist of the present disclosure will be omitted. For the same reason, some components are exaggerated, omitted or schematically shown in the attachment drawings, and the size of each component does not entirely reflect the actual size. The embodiments described herein and the configuration shown in the attached drawings of the present specification are merely the most preferred embodiments of the present disclosure, and they do not represent all the technical ideas of the present disclosure. Hence, it should be understood that there may be various equivalents and modified examples that can replace them at the time of filing the present application.

Figure 2:
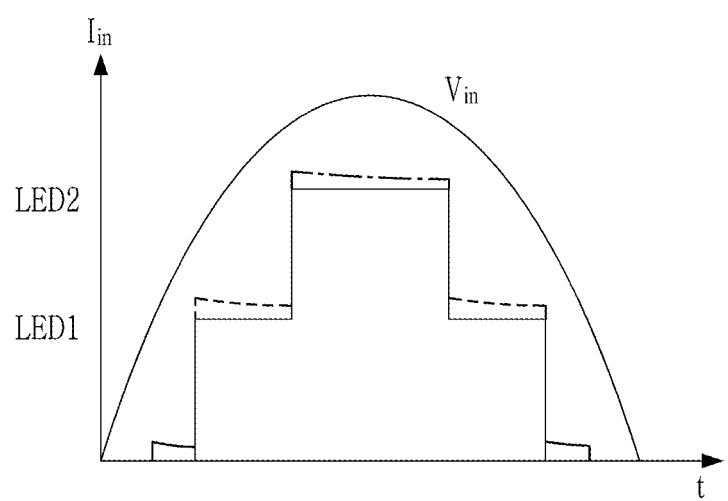
FIG. 2 is a diagram illustrating a flow of electric current according to a change of input voltage in an apparatus for supplying power to drive an alternating current (AC) direct-coupled light emitting diode according to an embodiment of the present disclosure.

First of all, the configuration of the apparatus for supplying power to drive an alternating current (AC) direct-coupled light emitting diode will be described. FIG. 1 is a diagram illustrating an apparatus for supplying power to drive an alternating current (AC) direct-coupled light emitting diode according to an embodiment of the present disclosure. FIG. 2 is a diagram illustrating a flow of electric current according to a change of input voltage in an apparatus for supplying power to drive an alternating current (AC) direct-coupled light emitting diode according to an embodiment of the present disclosure.

Referring to FIG. 1, a power supply device 10 according to an embodiment of the present disclosure includes a power unit 100, a rectifier unit 200, a light emitting unit 300, a signal generation unit 400, a switch unit 500, a microcontroller 600, and a driving unit 700.

The power unit 100 is used to supply alternating current (AC) which is commercial power. Namely, the power unit 100 supplies alternating current power to the power supply device 10. According to one embodiment, the power supply device 100 may become an alternating current (AC) voltage power source (Vac). The alternating current (AC) voltage power source (Vac) applies AC voltage to the power supply device 10.

The power unit 100 applies AC voltage to the rectifier unit 200, and the rectifier unit 200 rectifies the voltage and transmits the rectified voltage or current to the power supply device 10. At this time, since the rectified voltage or current is not smoothed after rectification, the amount of the voltage or current fluctuates according to time due to the characteristics of the alternating current (AC). The rectifier unit 200 may be composed of a diode bridge or a bridge rectifier. However, the rectifier unit 200 is not limited to this example and may include all kinds of circuits capable of converting alternating current (AC) into current having only one direction. The rectifier unit 200 receives alternating current power voltage from an alternating current power source, rectifies the voltage and supplies the rectified current. The rectifier unit 100 may rectify current by alternating current voltage as the positive terminal is connected to the anode of a first light emitting diode LED1 of the light emitting unit 300, and the negative terminal is grounded.

The light emitting unit 200 includes a plurality of light emitting diodes connected in series. The plurality of light emitting diodes of the light emitting unit 200, namely, the first light emitting diode LED1 and a second light emitting diode LED2, which are connected in series, receive rectified current from the rectifier unit 100, and emit light as conduction between the anode and the cathode of each light emitting diode LED1 or LED2 occurs. The cathode of each of the first light emitting diode LED1 and the second light emitting diode LED2 is connected to the driving unit 700 and the switch unit 500.

The signal generation unit 400 is connected to the output terminal of the rectifier unit 200 and distributes the voltage rectified by the rectifier unit 200. The signal generation unit 400 includes an input resistance Rin and a Zener diode Zin. The first terminal of the input resistance Rin is connected to the route, where rectified current is applied from the rectifier unit 200 to the first light emitting diode LED1, and the second terminal of the input resistance Rin is connected to the cathode of the Zener diode Zin. As such, the signal generation unit 400 may output a driving signal of a low voltage through the second terminal by dropping the output voltage Vin of the rectifier unit 200. At this time, the cathode of the Zener diode Zin is connected to the second terminal of the input resistance Rin, and the anode of the Zener diode Zin is grounded. As such, the Zener diode Zin plays a role in maintaining the level of the driving signal constant.

The switch unit 500 is connected to a plurality of light emitting diodes LED1 and LED2 of the light emitting unit 300, receives a driving signal, which is a voltage by distribution of the voltage rectified in the rectifier unit 100 by the signal generation unit 400, and switches the route of electric current flowing in the plurality of light emitting diodes LED1 and LED2 according to the inputted driving signal, to thereby be provided to the microcontroller 600.

The switch unit 500 includes a plurality of transistors, that is, first, second and third transistors Q1, Q2 and Q3, first, second and third switch resistances R1, R2 and R3 connected to each of the first, second and third transistors Q1, Q2 and Q3, and a ground capacitor Cg connected to the first, second and third switch resistances R1, R2 and R3.

The first, second and third transistors Q1, Q2 and Q3 are preferably formed using a Metal-Oxide-Semiconductor Field-Effect Transistor (MOSFET) such as PMOS or NMOS. The first transistor Q1 has a gate terminal which receives a driving signal, a drain terminal which is connected to the output terminal of the rectifier unit 200, and a source terminal which is connected to the first terminal of the first switch resistance R1. The second transistor Q2 has a gate terminal which receives a driving signal, a drain terminal which is connected to the cathode of the first light emitting diode LED1, and a source terminal which is connected to the first terminal of the second switch resistance R2. The third transistor Q3 has a gate terminal which receives a driving signal, a drain terminal which is connected to the cathode of the second light emitting diode LED2, and a source terminal which is connected to the first terminal of the third switch resistance R3.

Each of the second transistor Q2 and the third transistor Q3, except the first transistor Q1, is connected to its corresponding light emitting diode LED1 or LED2. In embodiments of the present disclosure, among transistors of the switch unit 400, a transistor such as the first transistor Q1, which does not have its corresponding light emitting diode LED, is referred to as "standby transistor", and a transistor such as the second transistor Q2 or the third transistor Q3, which has its corresponding light emitting diode LED1 or LED2, is referred to as "switch transistor".

The first terminal of the first switch resistance R1 is connected to the source terminal of the first transistor Q1, and the second terminal of the first switch resistance R1 is connected to the microcontroller 600 and the ground capacitor Cg connected to the ground. The first terminal of the second switch resistance R2 is connected to the source terminal of the second transistor Q2, and the second terminal of the second switch resistance R2 is connected to the microcontroller 600 and the ground capacitor Cg connected to the ground. The first terminal of the third switch resistance R3 is connected to the source terminal of the third transistor Q3, and the second terminal of the third switch resistance R3 is connected to the microcontroller 600 and the ground capacitor Cg connected to the ground.

On the assumption that the turn-on voltage (or gate voltage) of each of the first, second and third transistors Q1, Q2 and Q3 is each of VGQ1, VGQ2 and VGQ3, the first switch resistance R1 is greater than the second switch resistance R2, and the second switch resistance R2 is greater than the third switch resistance R3 (R1>R2>R3) according to an embodiment. As such, the turn-on voltage (or gate voltage) of the third transistor Q3 becomes greater than that of the second transistor Q2, and the turn-on voltage of the second transistor Q2 becomes greater than that of the first transistor Q1 (VGQ3>VGQ2>VGQ1). In another embodiment, in a state that all of the first switch resistance R1, the second switch resistance R2 and the third switch resistance R3 are the same, first, second and third transistors Q1, Q2 and Q3, in which VGQ3>VGQ2>VGQ1, may be used.

The ground capacitor Cg is connected to the microcontroller 600 in parallel on the ground.

The microcontroller 600 is connected to the switch unit 500 and is supplied power from the switch unit 500.

The driving unit 700 is connected to a plurality of light emitting diodes LED1 and LED2 of the light emitting unit 300, drives the light emitting unit 300, and determines the driving current flowing in the plurality of light emitting diodes LED1 and LED2. To this end, the driving unit 700 is connected to a distribution resistance Rs.

According to an embodiment of the present disclosure, the plurality of light emitting diodes LED1 and LED2 of the light emitting unit 300 is supplied rectified current from the rectifier unit 100 and emit light. Meanwhile, the signal generation unit 400 outputs the driving signal by dropping the output voltage Vin of the rectifier unit 200, the driving signal turns on the plurality of transistors of the switch unit 500 in order. As such, route of electric current flowing in the plurality of light emitting diodes LED1 and LED2 is switched by the plurality of transistors Q2 and Q3 of the switch unit 500 and are then provided to the microcontroller 600.

Referring to FIGS. 1 and 2, if the input voltage Vin is lower than the voltage of the first light emitting diode LED1, current is supplied to the microcontroller 600 through a first current flow I1, that is, through the first transistor Q1 and the first switch resistance R1. If the input voltage Vin is greater than the voltage of the first light emitting diode LED1 and is smaller than the sum of the voltage of the first light emitting diode LED1 and the voltage of the second light emitting diode LED2, current is supplied to the microcontroller 600 through a second current flow I2, that is, through the rectifier unit 100, the first light emitting diode LED1, the second transistor Q2, and the second switch resistance R2. If the input voltage Vin is greater than the sum of the voltage of the first light emitting diode LED1 and the voltage of the second light emitting diode LED2, current is supplied to the microcontroller 600 through a third current flow I3, that is, through the rectifier unit 100, the first light emitting diode LED1, the second light emitting diode LED2, the third transistor Q3, and the third switch resistance R3. Such a flow of current is controlled by using resistances which satisfy the condition that the first switch resistance R1 is greater than the second switch resistance R2, and the second switch resistance is greater than the third switch resistance R3 (R1>R2>R3), or by using first, second and third transistors Q1, Q2 and Q3 having turn-on voltages (or gate voltages) VGQ1, VGQ2 and VGQ3, respectively, which satisfy the condition that VGQ3>VGQ2 V VGQ1.

Figure 3:
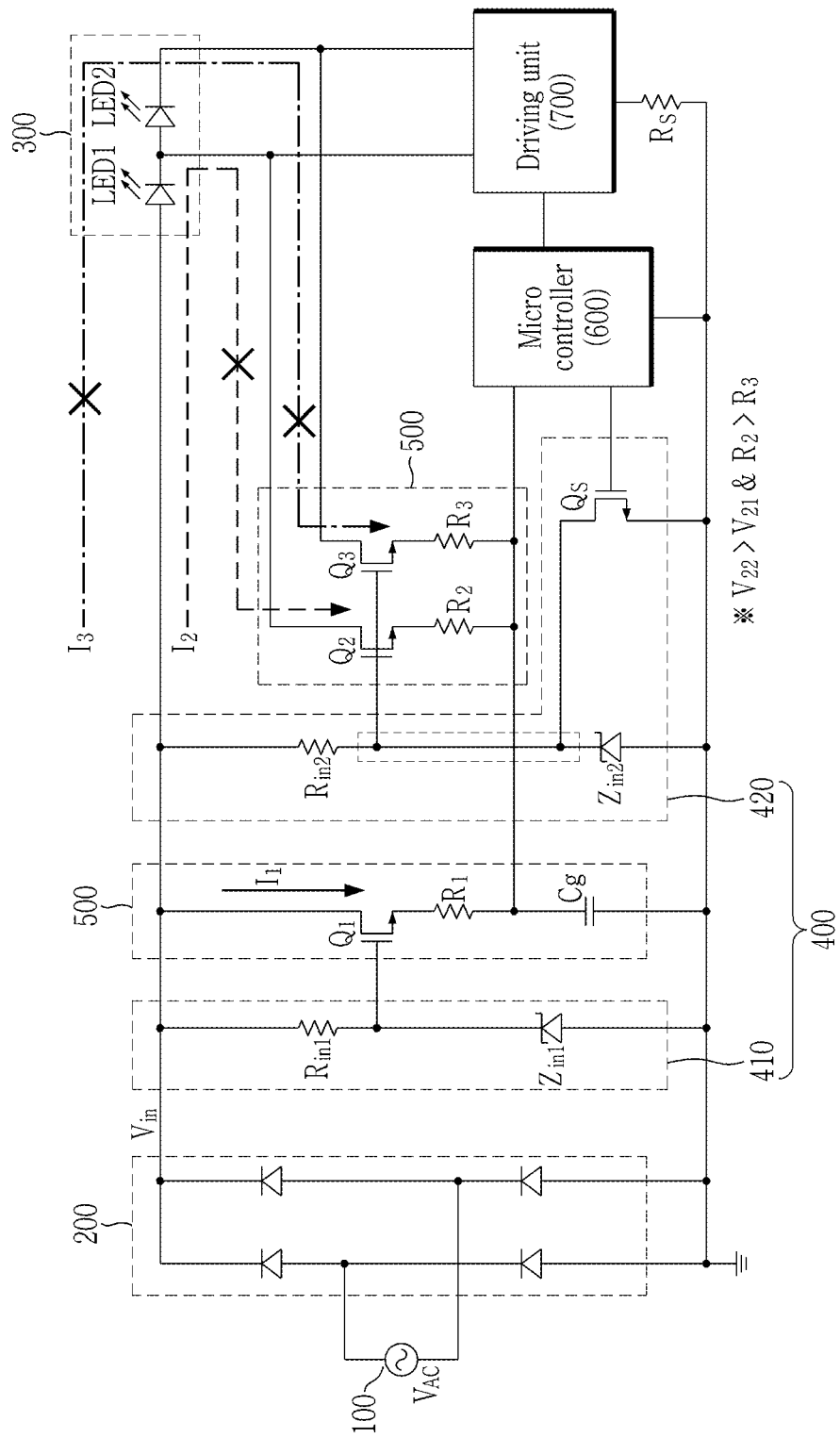
FIG. 3 is a diagram illustrating an apparatus for supplying power to drive an alternating current (AC) direct-coupled light emitting diode according to another embodiment of the present disclosure.
Figure 4:
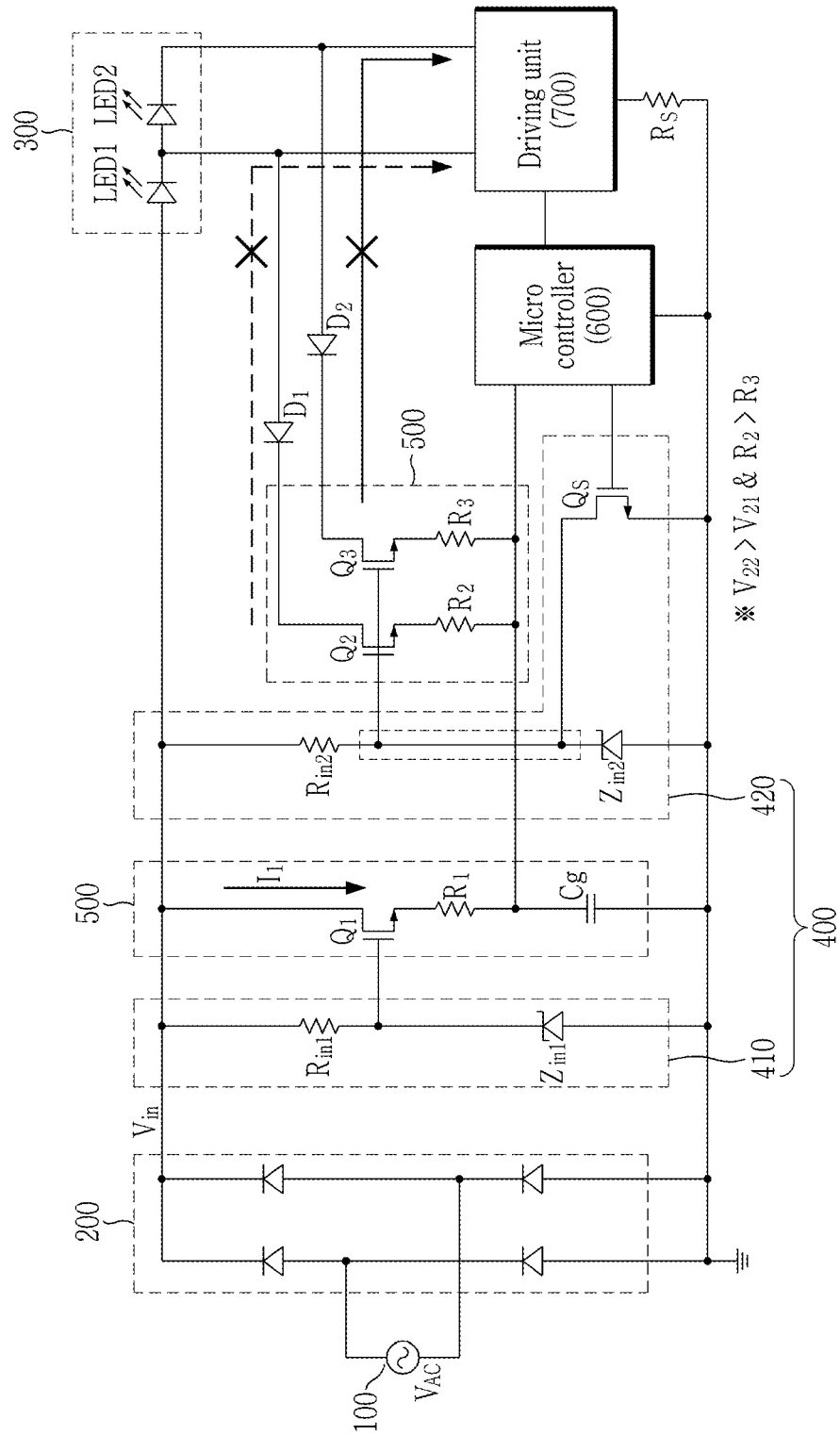
FIG. 4 is a diagram illustrating an apparatus for supplying power to drive an alternating current (AC) direct-coupled light emitting diode according to further another embodiment of the present disclosure.
Figure 5:
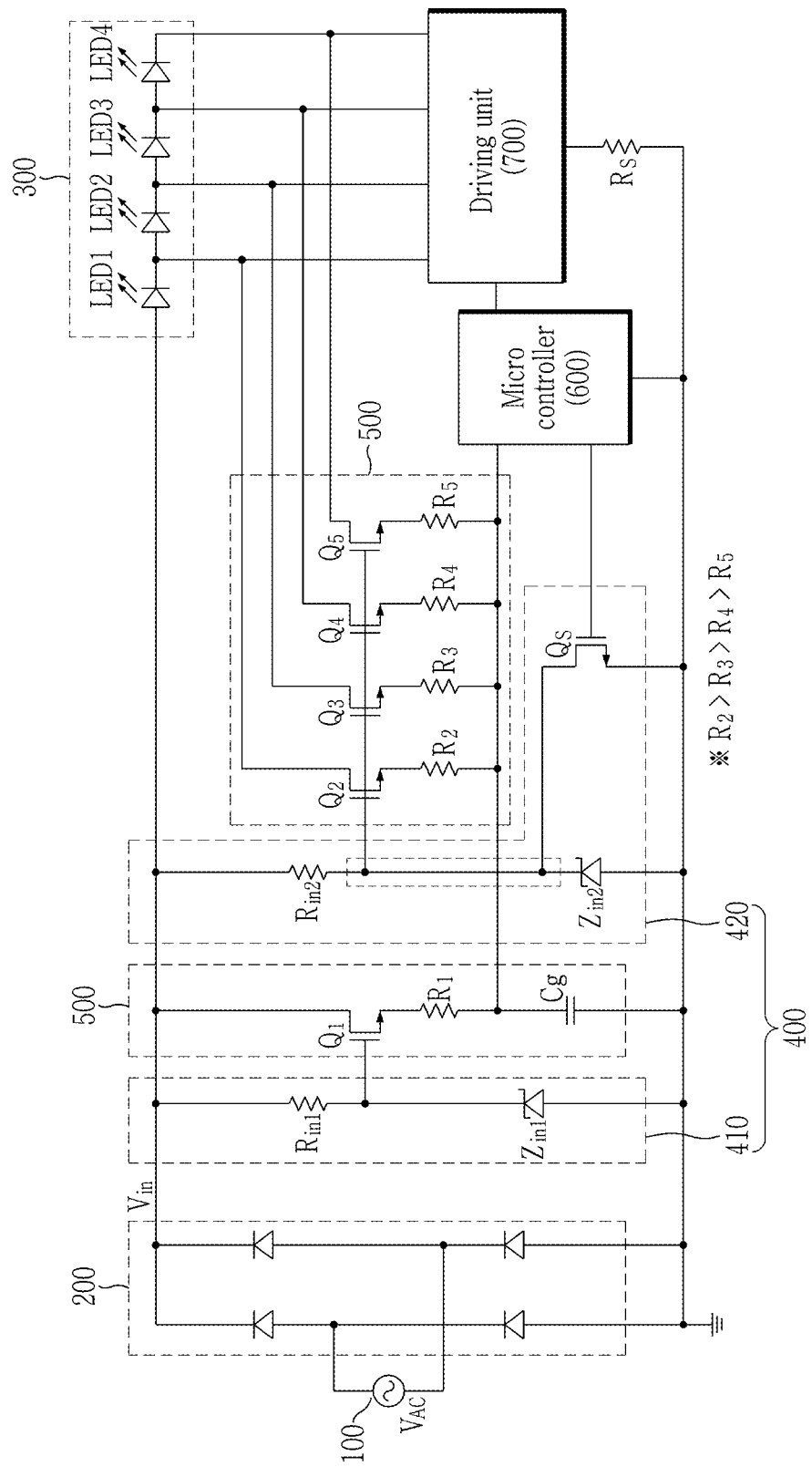
FIG. 5 is a diagram illustrating an apparatus for supplying power to drive an alternating current (AC) direct-coupled light emitting diode, which reflects a light emitting unit of the present disclosure.

However, as described above, since power is supplied to the microcontroller 600 through the channel of the light emitting diode LED, current flows as much as the standby state of the microcontroller 600 even when the lighting of the light emitting diode has been completely turned off. Hereinafter, other embodiments for preventing this will be described. FIG. 3 is a diagram illustrating an apparatus for supplying power to drive an alternating current (AC) direct-coupled light emitting diode according to another embodiment of the present disclosure. FIG. 4 is a diagram illustrating an apparatus for supplying power to drive an alternating current (AC) direct-coupled light emitting diode according to further another embodiment of the present disclosure. FIG. 5 is a diagram illustrating an apparatus for supplying power to drive an alternating current (AC) direct-coupled light emitting diode, which reflects a light emitting unit of the present disclosure.

Referring to FIG. 3, a power supply device 10 according to another embodiment of the present disclosure includes a power unit 100, a rectifier unit 200, a light emitting unit 300, a signal generation unit 400, a switch unit 500, a microcontroller 600, and a driving unit 700.

In this embodiment, the power unit 100, the rectifier unit 200, the light emitting unit 300, the switch unit 500, the microcontroller 600, and the driving unit 700 of the power supply device 10 are the same as those in the first embodiment of FIG. 1. Hence, the detailed description about the power unit 100, the rectifier unit 200, the light emitting unit 300, the switch unit 500, the microcontroller 600, and the driving unit 700 of the power supply device 10 will be omitted.

However, the signal generation unit 400 according to another embodiment may be divided into a first signal generation unit 410 and a second signal generation unit 420. Both the first signal generation unit 410 and the second signal generation unit 420 are connected to the output terminal of the rectifier unit 200 and distribute the voltage rectified by the rectifier unit 200 to thereby provide driving signals to the switch unit 500. Herein, the first signal generation unit 410 supplies a driving signal to the standby transistor of the switch unit 500, that is, the first transistor Q1, and the second signal generation unit 420 supplies a driving signal to the switch transistor of the switch unit 500, that is, the second and third transistors Q2 and Q3.

The first signal generation unit 410 and includes a first input resistance Rin1 and a first Zener diode Vz1. The first terminal of the input resistance Rin1 is connected to the route, where rectified current is applied from the rectifier unit 200 to the first light emitting diode LED1, and the second terminal of the input resistance Rin1 is connected to the cathode of the first Zener diode Zin1. As such, the first signal generation unit 410 may output a first driving signal through the second terminal by dropping the output voltage Vin of the rectifier unit 200. The first driving signal is applied to the gate of the first transistor Q1. At this time, the cathode of the first Zener diode Zin1 is connected to the second terminal of the first input resistance Rin1, and the anode of the first Zener diode Zin1 is grounded. As such, the first Zener diode Zin1 plays a role in maintaining the level of the first driving signal constant.

The second signal generation unit 420 includes a second input resistance Rin2, a first Zener diode Vz2, and a cutoff transistor QS. The first terminal of the input resistance Rin2 is connected to the route, where rectified current is applied from the rectifier unit 200 to the first light emitting diode LED1, and the second terminal of the input resistance Rin2 is connected to the cathode of the second Zener diode Zin2. As such, the first signal generation unit 410 may output a second driving signal to the second and third transistors Q2 and Q3 through the second terminal by dropping the output voltage Vin of the rectifier unit 200.

Namely, the second driving signal is applied to the gate of the second and third transistors Q2 and Q3. At this time, the cathode of the second Zener diode Zin2 is connected to the second terminal of the second input resistance Rin2, and the anode of the second Zener diode Zin2 is grounded. As such, the second Zener diode Zin2 plays a role in maintaining the level of the second driving signal constant.

At this time, the breakdown voltage of the second Zener diode Zin2 is greater than the breakdown voltage of the first Zener diode Zin1, and the resistance value of the second switch resistance R2 is greater than that of the third switch resistance R3.

The cutoff transistor QS is formed as MOSFET. The drain terminal of the cutoff transistor QS is connected to the second input resistance Rin2 and the gate terminal of the second and third transistors Q2 and Q3, and the source terminal of the cutoff transistor QS is grounded. Further, the gate terminal of the cutoff transistor QS is connected to the microcontroller 600.

As such, the cutoff transistor QS may turn off second and third transistors Q2 and Q3. Then current, which flows from the first and second light emitting diode LED1 and LED2 to the microcontroller 600, is blocked. In this way, when a low current in a standby state is required, it is possible to block a second current flow I2, which is a route of the rectifier unit 100, the first light emitting diode LED1, the second transistor Q2, the second switch resistance R2, and the microcontroller 600, and a third current flow I3, which is a route of the rectifier unit 100, the first light emitting diode LED1, the second light emitting diode LED2, the third transistor Q3, the third switch resistance R3, and the microcontroller 600, and to supply current through the first current flow I1, which is a route of the rectifier unit 100, the first transistor Q1, the first switch resistance R1, and the microcontroller 600, by turning off the second and third transistors Q2 and Q3 through the cutoff transistor QS Likewise, since the second current flow I2 and the third current flow I3 are completely blocked, the light emitting unit 300 may be completely turned off. To this end, the microcontroller 600 or the driving unit 700 may apply a cutoff signal, which gives a command to turn off the second and third transistors Q2 and Q3, to the cutoff transistor QS.

Further, according to further another embodiment shown in FIG. 4, diodes D1 and D2 may be interposed between the light emitting unit 300 and the switch unit 500. In the case of MOSFET applied to second and third transistors Q2 and Q3, current flowing in a reverse direction may be generated between the source and the drain due to a body diode. Hence, as illustrated in FIG. 4, it is possible to block current flowing in a reverse direction from second and third transistors Q2 and Q3 by inserting diodes D1 and D2 in the drain (or source) of MOSFET. More specifically, the first diode D1 is interposed between the drain terminal of the second transistor Q2 and the cathode of the first light emitting diode LED1. Namely, the cathode of the first diode D1 is connected to the drain terminal of the second transistor Q2, and the anode of the first diode D1 is connected to the cathode of the first light emitting diode LED1. As such, current, which flows from the second transistor Q2 in a reverse direction, is blocked.

Further, the second diode D1 is interposed between the drain terminal of the third transistor Q3 and the cathode of the second light emitting diode LED2. Namely, the cathode of the second diode D2 is connected to the drain terminal of the third transistor Q3, and the anode of the second diode D2 is connected to the cathode of the second light emitting diode LED2. As such, current, which flows from the third transistor Q3 in a reverse direction, is blocked.

Thereafter, according to an extended embodiment shown in FIG. 5, the light emitting unit 300 may form 4 channels by further including third and fourth light emitting diodes LED3 and LED4. As such, the switch unit 500 may further include fourth and fifth switch resistances R4 and R5 and fourth and fifth switch resistances R4 and R5 corresponding to third and fourth light emitting diodes LED3 and LED4, respectively.

In FIG. 5, when resistance values of a plurality of switch resistances R2, R3, R4 and R5 satisfy a condition that R2>R3>R4>R5, second to fifth transistors Q2, Q3, Q4 and Q5 may switch the route of electric current flowing in first to fourth light emitting diodes LED1, LED2, LED3 and LED to then be provided to the microcontroller 600.

Further, it is possible to completely block current flowing in the light emitting unit 300 by turning off second to fifth transistors Q2, Q3, Q4 and Q5 and turning on the first transistor Q1 only using the cutoff transistor QS.

According to the present disclosure, it is possible to separately supply power to a microcontroller, etc. using current flowing in light emitting diodes in an alternating current (AC) direct-coupled light emitting diode driving scheme.

The present disclosure has been described using some preferred embodiments, but these embodiments are merely exemplary and not limitative. Likewise, it will be understood that one of ordinary skill in the art, to which the present disclosure belongs, can make various changes and modifications within the scope of the rights presented in the idea and attached claims of the present disclosure.

What is claimed is:
1. An apparatus for supplying power, the apparatus comprising:
 a rectifier unit configured to apply a voltage by rectifying alternating current power source;
 a light emitting unit including a plurality of light emitting diodes which emit light by electric current according to the voltage and are connected in series;
 a signal generation unit configured to generate a driving signal by dropping the voltage of the rectifier unit; and
 a switch unit including a plurality of transistors which are connected to the plurality of light emitting diodes, respectively, and are turned on by the driving signal and switch a route of electric current flowing in the plurality of light emitting diodes to be supplied to a microcontroller as power source,
 wherein the plurality of light emitting diodes include:
 a first light emitting diode connected to an output terminal of the rectifier unit; and
 a second light emitting diode connected to the first light emitting diode in series, and
 wherein the plurality of transistors include:
 a first transistor having a gate terminal, which receives a first driving signal, and a drain terminal, which is connected to an output terminal of the rectifier unit;
 a second transistor having a gate terminal, which receives a second driving signal, and a drain terminal, which is connected to a cathode of the first light emitting diode; and
 a third transistor having a gate terminal, which receives a second driving signal, and a drain terminal, which is connected to a cathode of the second light emitting diode;
 wherein the switch unit includes:
 a ground capacitor;
 a first switch resistance having a first terminal connected to a source terminal of the first transistor and a second terminal connected to the ground capacitor;
 a second switch resistance having a first terminal connected to a source terminal of the second transistor and a second terminal connected to the ground capacitor; and
 a third switch resistance having a first terminal connected to a source terminal of the third transistor and a second terminal connected to the ground capacitor,
 wherein the first switch resistance is greater than the second switch resistance, and the second switch resistance is greater than the third switch resistance;
 wherein the signal generation unit includes:
 a first input resistance having a first terminal connected to a route through which electric current is applied from the rectifier unit to the first light emitting diode, and a second terminal connected to a cathode of a first Zener diode;
 the first Zener diode having the cathode connected to the second terminal of the input resistance, and a grounded anode;
 a second input resistance having a first terminal connected to a route through which electric current is applied from the rectifier unit to the first light emitting diode, and a second terminal connected to a cathode of a second Zener diode;
 the second Zener diode having the cathode connected to the second terminal of the second input resistance, and a grounded anode; and
 a cutoff transistor having a drain terminal connected to a gate terminal of each of the second transistor and the third transistor, and a grounded source terminal;
 a first diode having a cathode connected to the drain terminal of the second transistor and an anode connected to the cathode of the first light emitting diode; and a second diode having a cathode connected to the drain terminal of the third transistor and an anode connected to the cathode of the second light emitting diode.

2. The apparatus of claim 1, wherein when the cutoff transistor is turned on, the cutoff transistor turns off the second transistor and the second transistor to block current flowing from the first light emitting diode and the second light emitting diode, which is connected to the second transistor and the second transistor, to the microcontroller.

3. The apparatus of claim 1,
wherein the first diode blocks current flowing from the second transistor in a reverse direction;
wherein the second diode blocks current flowing from the third transistor in a reverse direction.

* * * * *